United States Patent [19]

Lagano et al.

[11] 4,440,137
[45] Apr. 3, 1984

[54] SUPPLEMENTAL FUEL SUPPLY DEVICE FOR I.C. ENGINE

[75] Inventors: Thomas Lagano, Juno Beach; William H. Batchelor, Jenson Beach, both of Fla.

[73] Assignee: Propane Carburetion Systems, Inc., Stuart, Fla.

[21] Appl. No.: 397,168

[22] Filed: Jul. 12, 1982

[51] Int. Cl.$^3$ ............................................. F02M 21/02
[52] U.S. Cl. .............................. 123/525; 123/27 GE; 123/527; 123/575; 123/528; 48/189.1; 48/189
[58] Field of Search ............... 123/525, 529, 527, 528, 123/27 GE, 575; 48/189.1

[56] References Cited

U.S. PATENT DOCUMENTS

| | | | |
|---|---|---|---|
| 2,279,530 | 4/1942 | Smith | 123/527 |
| 2,311,315 | 2/1943 | Smith | 48/180 |
| 2,612,145 | 9/1952 | Steven et al. | 123/27 GE |
| 2,781,030 | 2/1957 | Miller | 48/184 |
| 2,927,848 | 3/1960 | Baverstock | 48/184 |
| 2,928,382 | 3/1960 | Hug | 123/27 GE |
| 2,983,592 | 5/1961 | Jones | 123/527 |
| 3,443,551 | 5/1969 | Laubach | 123/27 GE |
| 3,698,365 | 10/1972 | Hallberg | 123/527 |
| 3,895,618 | 7/1975 | Cerf | 123/527 |
| 3,905,773 | 9/1975 | Brooks et al. | 123/527 |
| 3,948,224 | 4/1976 | Knapp et al. | 123/3 |
| 4,015,571 | 4/1977 | Stumpp | 123/527 |
| 4,046,120 | 9/1977 | Laprade et al. | 123/527 |
| 4,064,843 | 12/1977 | Holzbaur | 123/527 |
| 4,308,843 | 1/1982 | Garretson | 123/527 |

Primary Examiner—E. Rollins Cross
Attorney, Agent, or Firm—Bacon & Thomas

[57] ABSTRACT

A liquid and supplemental gas fuel supply system for an I.C. engine, and in particular a diesel cycle engine, includes a gas fuel control valve that meters supplemental gas fuel into the engine intake air stream in response to engine air flow using a direct air flow responsive member to control a gas valve through a lost motion connection. The position of the gas valve is moreover controllable by a separate throttle position responsive control system that moves the gas valve towards closed position as the throttle approaches the closed or idle position, and holds the gas valve closed until the throttle has moved away from the closed or idle position. The separate control motion of the gas valve is independent from the motion of the air flow responsive member and does not restrict or interfere with the movement of the latter.

12 Claims, 5 Drawing Figures

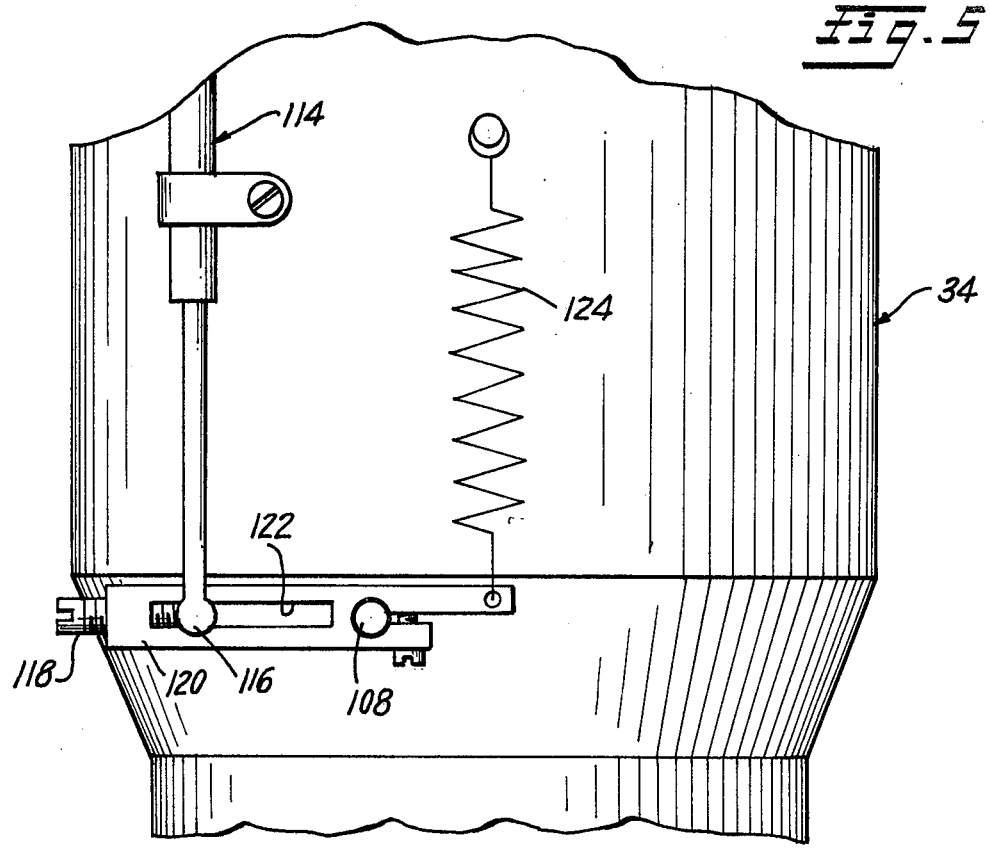
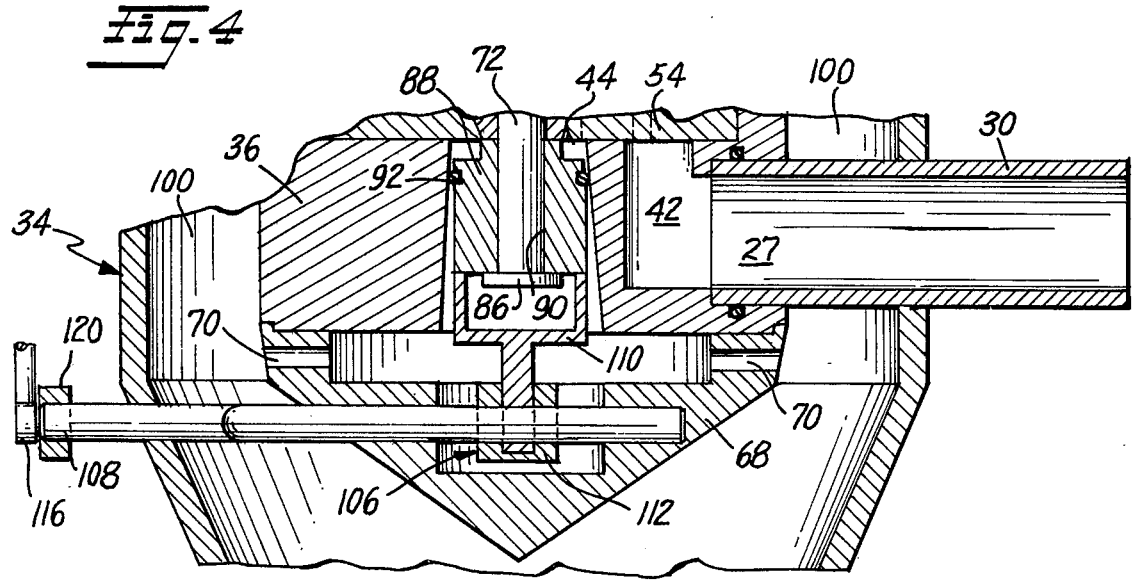

SUPPLEMENTAL FUEL SUPPLY DEVICE FOR I.C. ENGINE

TECHNICAL FIELD OF THE INVENTION

The present invention is directed to a apparatus for the dual fuel operation of an internal combustion engine. The fuels contemplated for use with the invention are (1) a liquid fuel supply consisting of, for example, diesel fuel; and, (2) a gas fuel supply consisting of propane.

SUMMARY OF THE INVENTION

This invention relates to a propane or other supplemental gas fuel injection valve system for use in combination with a diesel powered internal combustion engine. The device allows the use of lower cost propane or other gas fuel in combination with the use of diesel fuel. It has been found that propane increases the efficiency of a diesel engine, thereby allowing a prospective diesel engine purchaser to purchase a smaller engine to do substantially the same work as a large engine counterpart running on diesel fuel alone. Also, the addition of propane causes a more complete combustion of diesel fuel entering the engine. This has been noted by a marked drop in the exhaust temperature in a diesel engine after propane has been injected and the throttle has been reduced to the same torque as it was with a straight diesel. Due to the more complete combustion of the diesel fuel, pollution is greatly reduced by reducing the amount of the unburned diesel fuel previously passed through the exhaust system. This is also an important ecological consideration. The valve unit, of the present invention, is designed to inject gas fuel into the intake air of a diesel. The unit is designed to meter the gas in proportion to the air demanded by the engine. In one embodiment, the air demanded by the engine creates a pressure differential across an inlet air flow responsive element of the gas injection valve so as to control the opening and closing of the valve so as to control the amount of gas injected into the internal combustion engine. The element which is responsive to the incoming air is disposed at one end of a cylindrical chamber within which is located a biasing means. The incoming air to the internal combustion engine causes a pressure drop in the chamber and, as the pressure falls in the chamber, the atmospheric pressure creates a force which compresses the spring and allows the air flow responsive element to open until the tension of the biasing means equals the forces acting on the air reactor member due to incoming air flow. Due to the interconnection of the valve, the air flow responsive element controls the position of a gas valve which acts to meter the incoming gas supply to the internal combustion engine. The higher the air flow, the more the gas valve is moved to an open position thereby allowing more gas to enter the engine. The element responsive to the air flow may be adjustably positioned by means of a threaded engagement with a valve stem connected to the gas valve. Accordingly, the gas fuel can be injected in response to varying engine speeds.

A second aspect of the invention utilizes a direct mechanical connection between the gas valve and the engine throttle control. In this concept, the gas valve is held in a closed position until the cable is actuated by the throttle control as the throttle is initially opened. As the throttle is moved to increase engine speed the cable is actuated, and a control arm imparts rotational movement to a shaft member which carries a yoke in contact with the valve. Upon rotation of the shaft, the yoke member moves away from a top dead-center arrangement which normally keeps the valve in a closed position and the degree of rotation determines the degree of opening of the valve which is acted upon by the gas fuel pressure and the inlet manifold pressure. Therefore, the amount of gas which is allowed to be injected into the engine will initially be controlled by throttle position, and thereafter by the air flow responsive member. As in the first embodiment, an adjusting means is provided for determining the amount of movement of the crank arm and control shaft. This would again require a predetermined engine speed to be reached before gas injection is initiated.

BRIEF DESCRIPTION OF THE DRAWINGS

FIG. 4 is a partial, side view, in cross-section, of an alternative embodiment of the present invention; and, FIG. 5 is a schematic representation of a control system for the embodiment shown in FIG. 4.

DETAILED DESCRIPTION OF THE PREFERRED EMBODIMENT

Figure 1:
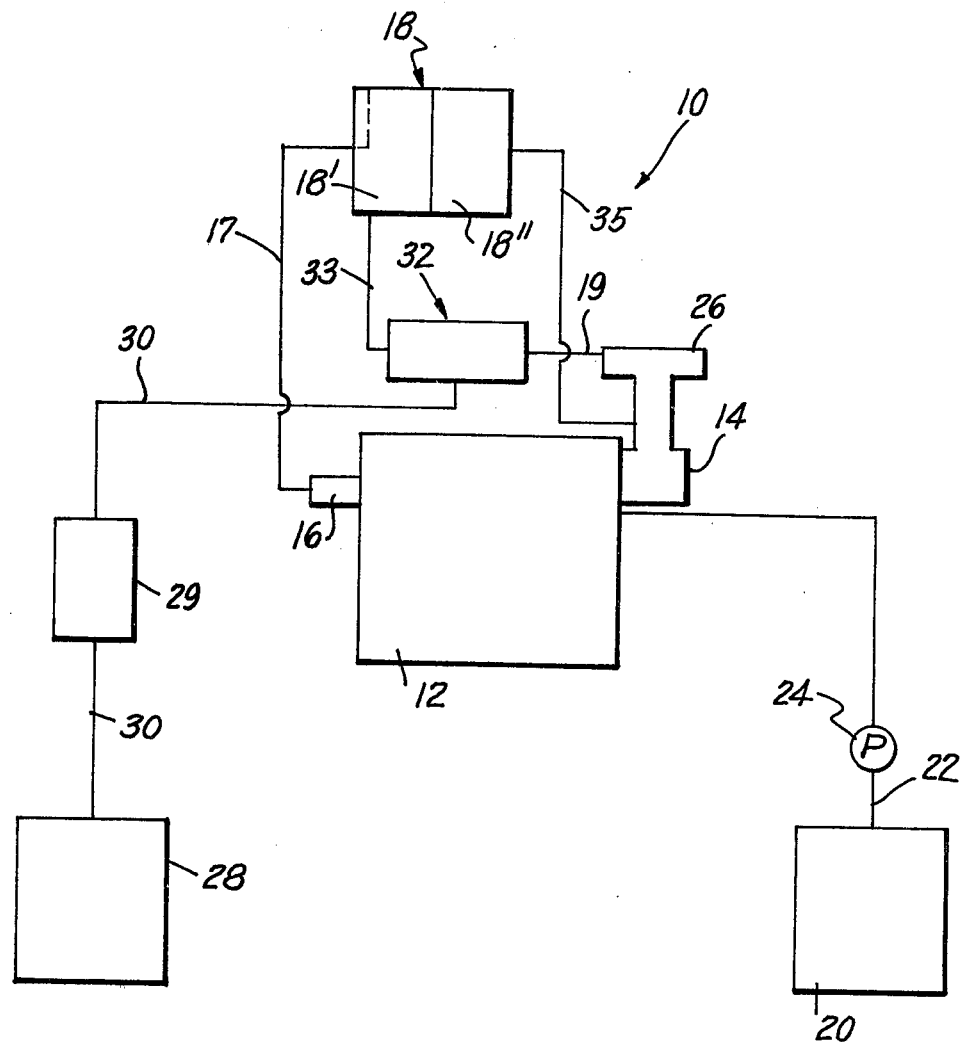
FIG. 1 is a schematic representation of the dual fuel system according to the present invention.

Reference numeral 10 indicates a schematic representation of the dual fuel system as contemplated by the present invention. Internal combustion engine 12 has an intake manifold 14 and an exhaust manifold 16. Connected between the manifolds 14–16, is a turbocharger 18 with an intake side 18' and a compression discharge side 18". A supply tank 20 containing liquid fuel supplies the fuel to a fuel injection system (not shown) for injection to the combustion chambers (not shown) via a conduit 22, and a pump 24. An air cleaner 26 is mounted on the engine in any well-known manner and is adapted to deliver air so as to ensure the proper air/fuel ratio for combustion within engine 12 and also, by conduit 19 to the injection valve 32 of the present invention. A gas fuel supply (e.g., propane) is indicated at 28 and is connected by conduit 30 to a vaporizer regulator 29, for vaporizing the gas, and the gas fuel metering or control valve, of the present invention, indicated generally at 32. The metering or control valve 32 is attached so as to receive air demanded by the engine and, when actuated, to transmit the air/gas vapor mixture to the turbocharger 18 via conduit 33. The turbocharger 18 is driven by exhaust gas from the exhaust manifold 16 via conduit 17 or, in the alternative, by any well-known manner. The compression side 18" supplies the mixture to the intake manifold 14 via conduit 35. The unit 32 is designed to meter the gas fuel in proportion to the air demanded in accordance with engine speed as will be explained in further detail below.

Figure 2:
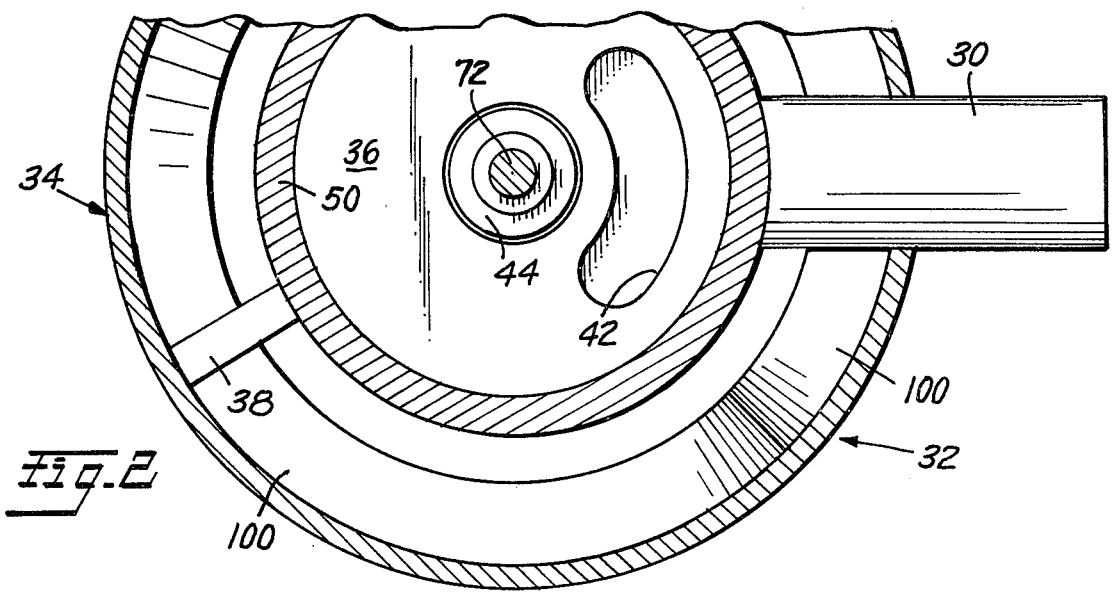
FIG. 2 is a top view of the gas injection metering valve of the present invention.
Figure 3:
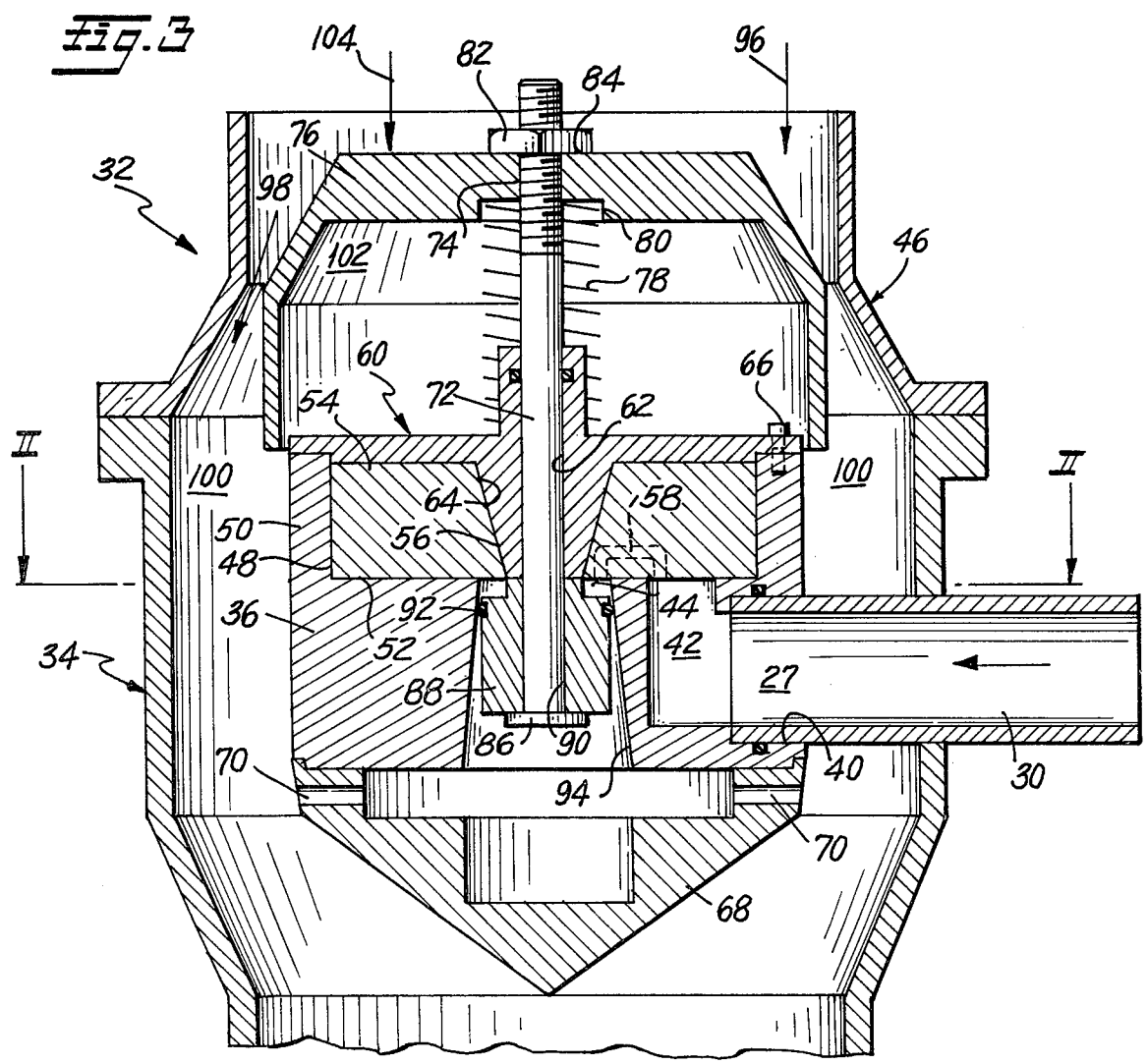
FIG. 3 is a side view, in cross-section, of the metering valve.

FIG. 2 is a top sectional view taken along the lines II—II in FIG. 3. The housing casing is shown at 34 and supports a valve body 36 by a three-post mounting arrangement, one of which is shown at 38. The gas fuel inlet conduit 30 is received within an opening 40 of the valve body 36. As shown, the body member 36 has a gas entrance passage 42 for receiving the gas fuel supply from the conduit 30. The duct 42 is fluidly connected, in a manner to be explained later, with a central aperture 44 in the valve body 36.

The valve body unit 32, shown in FIG. 3, is contained within a two-part casing 34, 46. The valve body assembly 36 defines an L-shaped area, when viewed in cross-section, which is defined by a vertically extending wall portion 50 and a horizontally extending ledge portion 52. The L-shaped area 48 positions a guide block 54. The guide block 54 is provided with converging side walls 56 which define a centrally located, circular aperture. The guide block 54 also defines a plurality of gas passages, one of which is shown at 58, which allows the gas fuel to communicate between gas entrance passage 42 and the central body aperture 44 of the valve body assembly 36. A valve cover assembly 60 is provided with a central aperture 62 and converging side walls 64. The side walls 64 and 56, of the cover and guide block, respectively, are mounted in flush engagement with each other. The valve cover 60 may be secured to the vertically extending wall portions 50 of the valve body 36, by any known manner which ensures a tight seal. For purposes of illustration, a bolt attachment is shown at 66.

Secured to the base of the valve body assembly 36 is a cone-shaped orifice housing 68. As with the cover assembly 60, the orifice housing 68 may be secured to the body assembly 36 by a series of screws, not shown, arranged around the periphery of the housing 68. This arrangement would be similar to the attachment means 66 for the cover assembly 60. As will be described later, orifices 70 are provided for directing the gas fuel from the central aperture 44 into the air stream of the internal combustion engine 12.

Slidably mounted within the cover assembly 60 is a rigid rod connector 72. As shown in FIG. 3, one end of the rod 72 is threadedly engaged at 74 with air flow responsive member 76. A spring member 78 biases the member 76 away from the valve cover element 60. The spring 78 is concentric to the rod 72 and one end is seated within member 76 within a shoulder 80. The other end of the spring 78 is seated against the valve cover 60. An adjusting member 82 is threadedly engaged with the rod 72 and contacts the member 76 at 84. The adjusting means 82 allows the relative position of the air flow responsive member 76 to be changed on rod 72 by loosening the adjustment means 82 and threading the member 76 up or down on rod 72. This changes the relative position of the member 76 with respect to the casing member 46.

At the opposite end of the threaded section 74 of the rod 72 is a stop member 86. The stop member 86 supports and fixedly positions valve element 88 comprising a rectilinearly movable plug in a tapered bore 94. The valve element 88 has a central aperture 90 to allow the valve stem rod 72 to pass therethrough. Circumferentially surrounding the valve element 88 at its topmost portion of largest radius is an O-ring 92. When the valve 88 is in its closed position, i.e., when it does not allow gas to pass into the air stream of the engine, the O-ring 92 sealingly engages with the diverging side walls of the bore 94.

In operation, the unit 32 is designed to inject gas that has been vaporized into the intake manifold of an internal combustion engine, and in the case contemplated by the present invention, a diesel engine. The unit is designed to meter the gas in proportion to the air demanded by the engine as determined by throttle position (engine speed). Air enters the unit 32 in the direction of arrow 96, and passes the air flow responsive member 76 in the direction of arrow 98 into the cylindrical chamber 100. A lower pressure is created in chamber 100 due to the pressure drop across member 76 caused by the force exerted by spring 78. Thus air is demanded by the engine, incoming air flow causes a pressure drop in chamber 100 and chamber 102, respectively. As the pressure falls in chambers 100 and 102, the atmospheric pressure exerts a force in the direction of arrow 104 and compresses spring 78 as member 76 is forced in the direction of arrow 104. Air flow responsive element 76 will open until a balance between an engine air demand plus the spring tension in spring 78 equals the incoming atmospheric pressure. The position of the member 76 controls the position of the gas valve element 88. Gas valve 88 seals off the gas passage completely by an O-ring 92. As the engine demands more air, the valve 88 is forced down the diverging walls 94 of the valve body 36 by pressure differential forces. The further the valve 88 is forced down the diverging passage, the more gas is allowed to pass from the gas entrance passage 27, through the gas passageways 58, to the gas inlet area 44 of the valve body 36. The gas vapors enter the conduit 33 through the orifices 70. After compression in the turbocharger 18, the mixture is introduced into the intake manifold 14. As previously discussed, the relative positioning of the air flow responsive member 76 can be changed on rod 72 by loosening the fastening means 82 so as to change the relative position of the member 76 with respect to the casing section 46. Accordingly, this changes the engine rpm when the gas injection is to start entering the airstream. Accordingly, it is to be understood that the system has two modes of operation, i.e., liquid fuel alone or a combination of liquid fuel and gaseous fuel.

FIG. 4 discloses an alternate embodiment of the gas inlet valve 32 disclosed in FIG. 3.

The embodiment of FIG. 4 relates essential to the mechanism by which valve 88 is operated and controlled. Accordingly, like elements of FIG. 4 will be denoted by the same reference numerals as set forth in the disclosure of FIG. 3. In this embodiment, the gas inlet valve element 88 is allowed to slide freely on the rod 72 forming a lost motion connection, in that rod 72 can move one way (down) without moving valve element 88, but will positively drive the valve element towards a closed position when it moves the other way (up). A stop element 86 is provided on the end of the rod 72 to effect positive closing motion. A crank lever assembly, for controlling the opening and closing of the aperture 44 by the valve element 88, is indicated generally at 106. The assembly 106 is rotationally attached to the shaft 108 which, in turn, is operatively connected to the engine throttle in a manner to be explained below.

The crank assembly and shaft 106, 108, respectively, are positioned within the cone-shaped orifice housing 68. The assembly 106 consists of a yoke member 110 fixedly attached to the shaft 108 and a stop member 112. The yoke assembly 110 is engaged, in cam and follower relationship with the bottom surface area of the valve element 88 so as to control its reciprocating movement within the aperture 44 of the valve body element 36 as defined by the diverging wall portions 94. The rotational movement of the shaft 108 is controlled by a cable 114 connected to the engine throttle (not shown). An end 116, of the cable 114, is attached to the crank lever assembly 106 by an adjustment member 118. The adjustment member 118 is threadedly engaged with a control arm 120. The control arm 120 has a slot 122 which allows the cable end 116 to be attached to the screw 118. Further, the slot 122 determines the maximum and minimum rotational movement of shaft 108 and hence, the maximum and minimum reciprocating travel of the valve 88, which in turn determines the percentage of gas entering into the airstream of the engine. A spring 124 functions as the return spring for the crank assembly 106. This spring 124 holds the gas valve closed unless the throttle of the engine is depressed.

In operation, the valve element 88 is held in a closed position by the spring 124 until the cable 114 is actuated by the throttle, not shown. Because of the lost motion connection, movement of the rod 72 and the air reaction member 76 is unrestricted, and these elements can still move in response to air flow pressure. Once the cable 114 is actuated, the crank arm 120 rotates shaft 108 and with it, yoke 110. The rotational movement of the yoke 110 allows the valve element 88 to move to an open position and an amount of gas, determined by the adjustment of screw 118, enters the turbocharger 18 and the engine 12, as previously discussed. After the throttle has moved beyond a low throttle position near idle, of course, yoke 110 is moved by the throttle cable and valve element 88 moves in accordance with the fluid pressures acting on it to seat against the stop 86, at which time the valve element follows the motion of rod 72 until or unless the yoke 110 moves the valve element towards the closed position independently of the air flow responsive member as the throttle moves towards its idle position.

While the invention has been described in terms of certain preferred embodiments, the skilled worker in the art will recognize that there are various changes, omissions, modifications, and substitutions that may be made without departing from the spirit of the invention. Accordingly, it is intended that the scope of the present invention be limited solely by that of the following claims.

We claim:

1. A control valve for a gas fuel supply to an internal combustion engine including an air intake conduit means comprising:
    a valve housing including an air duct extending through the housing and having inlet and outlet ends, the housing arranged to be connected to said air intake conduit means so that the outlet end of said air duct is in communication with said conduit;
    a movable air flow responsive member in said duct arranged to be deflected in a first direction by forces resulting from air flowing through said duct towards the outlet end thereof;
    means for resiliently biasing said air flow responsive member in a direction opposite to said first direction of deflection towards a nondeflected position;
    a gas fuel inlet into the housing;
    a gas fuel passageway in the housing providing communication between said gas fuel inlet and said air duct at a point between said air flow responsive member and the outlet end of said duct;
    a valve element for controlling gas fuel flow through said passageway, said valve element movable between closed and open positions in response to the movement of said air flow responsive member between undeflected and deflected positions, respectively; and
    valve element control means for moving said valve element towards and maintaining same at a closed position independently from said biasing means; movement of said air flow responsive member being unrestricted by said valve element control means.

2. A control valve as claimed in claim 1, said valve element connected to said air flow responsive member by a lost motion connection that permits said valve element to move towards an open position when said air responsive member is deflected, but positively drives the valve towards a closed position when said air responsive member is moved into its undeflected position.

3. A control valve as claimed in claim 2, said lost motion connection comprising a rigid rod connector extending between said air flow responsive member and said valve element, with said rod connector engaging said valve element so that the rod connector can move independently of the valve element when the rod connector moves in one direction in response to deflection of said air responsive member, but directly engages and carries the valve element with said rod connector when the rod connector is moved in the reverse direction, at least as said air responsive member approaches its undeflected, at-rest position.

4. A control valve as claimed in claim 3, said air flow responsive member and rod connector together for simultaneous movement in a rectilinear direction within said duct when said air flow responsive member is deflected; said valve element likewise being movable rectilinearly between open and closed positions; said valve element mounted on and supported by said rod through a sliding connection; said rod having a laterally enlarged valve element engaging means adjacent its distal end; said valve element engaging means retaining said valve element assembled to said rod and comprising means for directly engaging and carrying the valve element when the rod is moved in said reverse direction by limiting the endwise sliding motion of said valve element along said rod.

5. A control valve as claimed in claim 2, said valve element control means comprising movable means secured to said housing and actuatable from the exterior of the housing.

6. A control valve as claimed in claim 3, said valve element control means including means for resiliently biasing said valve control means in a direction to urge said valve element towards a closed position.

7. A control valve as claimed in claim 6, said valve element comprising a rectilinearly movable plug in an elongated tapered valve port that is in communication with said gas fuel inlet at one end and said air duct at its other end, and said valve element control means comprising a cam member directly engageable with said valve element, and means for moving said cam element; movement of said cam means in a single direction causing progressive rectilinear movement of said valve element towards a closed position.

8. A control valve as claimed in claim 2, including an internal combustion engine having an air intake supply conduit and a throttle means for controlling engine speed and power, said throttle means movable between open and closed positions, said control valve connected to said conduit so that substantially all of the engine intake air passes through said duct, said valve element control means comprising a connection between said throttle means and said valve element arranged to cause said valve element to be urged towards a closed position when said throttle means is moved towards a closed position.

9. A control valve as claimed in claim 8, said connection including means for varying the relationship between input throttle motion and output valve element control motion.

10. A control valve as claimed in claim 2, including a diesel-type internal combustion engine having an air intake supply conduit in communication with air intake ports of said engine, and an injector-type liquid fuel supply system; said control valve connected to said air intake supply conduit so that all of the engine intake air passes through the duct of said control valve and said air intake supply conduit.

11. A control valve as claimed in claim 10, including an intake air pressurizing means controllable in response to engine speed in said air intake supply conduit between said control valve and said engine air intake ports.

12. A control valve as claimed in claim 11, said air pressurizing means comprising an engine exhaust gas driven turbocharger.

* * * * *